R. L. WILSON.
PLANT SETTER.
APPLICATION FILED JUNE 3, 1918.
1,298,134.
Patented Mar. 25, 1919.
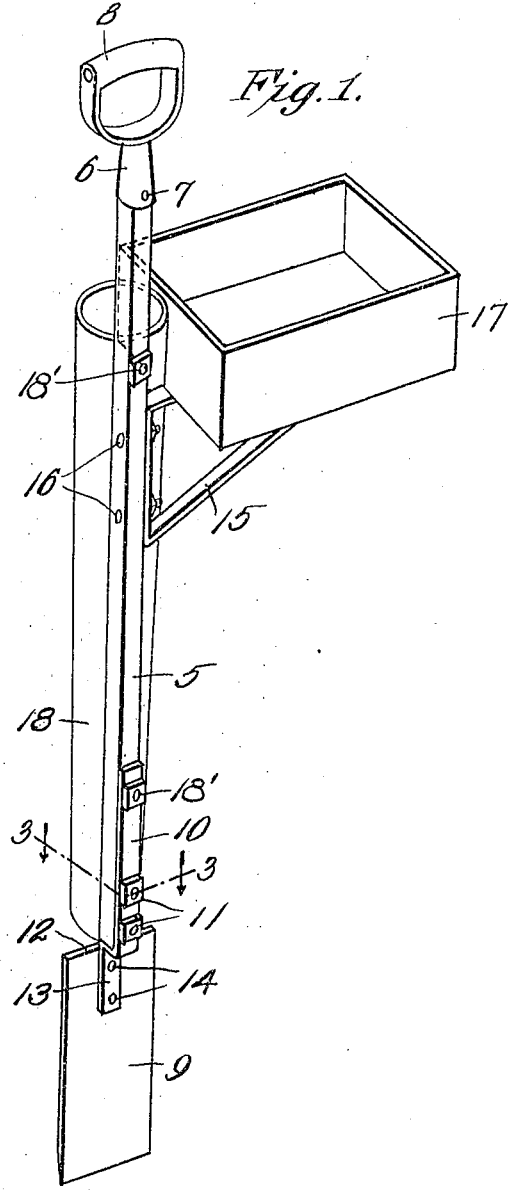
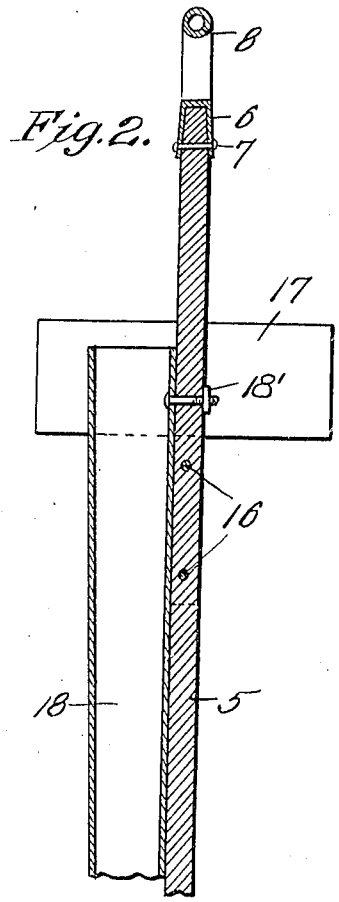
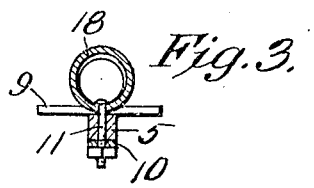
WITNESSES
INVENTOR
Richard L. Wilson,
BY
ATTORNEY

UNITED STATES PATENT OFFICE.

RICHARD L. WILSON, OF UNION CITY, TENNESSEE.

PLANT-SETTER.

1,298,134.                    Specification of Letters Patent.    Patented Mar. 25, 1919.

Application filed June 3, 1918.  Serial No. 238,002.

*To all whom it may concern:*

Be it known that I, RICHARD L. WILSON, a citizen of the United States, residing at Union City, in the county of Obion and State of Tennessee, have invented certain new and useful Improvements in Plant-Setters, of which the following is a specification.

This invention is a plant setter and has special reference to agricultural implements.

One object of this invention is the production of a plant setter which is constructed so as to facilitate the formation of a hole for the depositing of a plant therein, together with means for directing the plant down into the hole thus formed.

Another object of this invention is the production of a plant setter which has a plant carrying box thereon, thus allowing the operator to make a hole and then drop a plant into the hole without the necessity of bending or other objectionable or laborious actions.

Another object of this invention is the production of a plant setter wherein the handle of the spade has a tube thereon, the upper end of the tube being contiguous to the plant box, thus permitting a plant to be lifted from the box and dropped downwardly through the tube to be directed into the hole or pocket formed by the spade.

Broadly stated, the invention consists of a handle bar, a blade carried upon the lower end of the bar, a guide tube secured to the handle bar and extending to a point adjacent the handle of the bar, a bracket carried upon said handle bar and extending at right angles to the surface upon which the guide tube is carried, and a plant box carried upon the bracket adjacent the upper end of the guide tube.

One practical form of construction and assembly of the present invention will be hereinafter described and is illustrated in the accompanying drawing, in which—

Figure 1 is a detail perspective view of the plant setter.

Fig. 2 is a central vertical section through the upper portion of the handle bar and the tube, the plant box being shown in elevation, and Fig. 3 is a section taken on the line 3—3 of Fig. 1.

In the preferred embodiment of the present invention, about to be described, 5 designates the handle bar which is elongated, and is illustrated herein as square, although of course it may be round or of any other desired shape or size. The sleeve 6 is held by a rivet 7 upon the upper end of the bar 5 and has the grip 8 formed thereon.

The blade 9 is positioned at the opposite end of the handle bar 5. This blade 9 is preferably rectangular, although it is comparatively narrow, as it is constructed to facilitate the formation of a pocket in which the plant may be set although it is of such size as to prevent the making of a pocket too large, which would allow the plant to fall over before the same could be held in an upright position by packed ground. The retaining strip 10 is bolted as indicated at 11 upon the handle bar 5 adjacent its lower end and this strip is provided with a projecting portion 12 extending at right angles thereto. This projecting portion 12 is also bent to form an off-set extension 13 which is riveted as indicated at 14 upon the blade 9, thus firmly supporting the blade upon the lower end of the handle bar 5.

The guide tube 18 is preferably cylindrical and is elongated, to fit upon the handle bar 5. Bolts 18 pass through the guide tube 18 and also through the handle bar for fixing this guide tube in a set position. It is desired to have the tube slightly larger in diameter at its upper end than at its lower end, although this is not absolutely necessary for the efficient operation of the device. The lower end of this guide tube 18 terminates at lower end of the handle bar contiguous to the upper end of the blade 9. The upper end of this guide tube 18 terminates at a point below the grip 8, as shown in Figs. 1 and 2.

The triangular bracket 15 is bolted as shown at 16 upon the handle bar 5 at a point adjacent its upper end. It will be noted however, that this bracket 15 extends at right angles to the surface upon which the guide tube 18 is carried. The plant box 17 is carried upon the bracket 15 and this plant box is for this reason supported adjacent the grip 8. The box may be constructed as herein illustrated, consisting of a bottom having side walls, or it may be of any other desired shape. This box by being supported upon the bracket 15 will be carried adjacent the upper end of the guide tube 13, owing to the peculiar extension of the bracket 15.

When the present device is in operation, a number of plants may be carried within the box 17. The operator may then force the blade 9 into the ground and may then either oscillate the upper end of the handle bar or may push the blade slightly in one direction, thus forming a pocket in which a plant may be placed. Since the blade is comparatively narrow, it will be seen that a pocket will be comparatively small and thus prevent the falling over of the plant, even before the same is packed or finally held in a set position by the engagement of the earth on all sides thereof. At this time the plant may be taken from the box 17 and deposited in the upper end of the guide tube 13. Accordingly, the plant upon being released will fall through the guide tube 18, although this tube is of such size as to prevent the top of the plant from moving first into the pocket by an accidental inversion of the plant. However, as the lower end of the guide tube is adjacent the blade 9, it is obvious the plant will pass therefrom into the pocket formed by the blade. The blade may then be withdrawn from the ground and the earth packed around the plant thus dropped into the pocket.

By this operation, it will be seen that plants may be rapidly set out by the insertion of the blade and the forming of the pocket and then the dropping of a plant through the tube and the final packing of the earth around the plant. Therefore, this device will not only allow the entire planting operation to be performed by a single person but will also relieve laborious work by the ordinary stooped position assumed by a person dropping the plants into the pocket formed for the receipt thereof.

From the foregoing description, it will be seen that a very simple and efficient plant setter has been provided, which will facilitate the rapid planting of plants with the least amount of exhaustive or energetic labor. The parts are comparatively few and for this reason the possibility of the structure becoming out of order when in use, is greatly minimized, although the arrangement of the box with respect to the tube and the tube with respect to the blade will facilitate the proper planting of a plant and the operation of the device.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a device of the class described, the combination of a handle bar, a strap fixed upon said handle bar and provided with a right-angularly extending projection engaged with the lower end of the handle bar and terminating in an off-set extension, a blade fixed upon the off-set extension to be in alinement with the opposite side of the handle bar, a guide tube fixed upon said handle bar and terminating contiguous to the upper end of the blade and adjacent the upper end of the handle, and an open plant box secured to said handle at the upper end of the tube, thus permitting plants to be lifted from the box and dropped into the tube to pass downwardly into a pocket formed by said blade.

2. In a device of the class described, the combination of a handle bar, a blade carried by said handle bar, said handle bar including flat side surfaces, a guide tube fixed upon one flat side surface, a triangular bracket fixed upon one flat side and extending from the handle in a plane parallel to a plane extending across the flat side surface upon which the tube is secured, and a flat plant box fixed upon said triangular bracket at a distance from said handle bar, thus providing sufficient space for the tube, although said box extends beside the tube at its upper end for allowing a plant to be easily lifted from the box and deposited in said tube.

3. In a device of the class described, the combination of a handle bar, a blade carried by said handle, a guide tube fixed upon said handle bar, a bracket fixed upon said handle bar and projecting outwardly therefrom, and a flat plant box fixed upon said bracket at a distance from the handle bar, thus providing sufficient space for the reception of said tube behind the box, although said box is at the upper end of the tube for allowing of the manual lifting of a plant from the box and the easy depositing of the said plant in said tube.

In testimony whereof I affix my signature in presence of two witnesses.

RICHARD L. WILSON.

Witnesses:
HARRIS PARKS,
C. V. JONES.